(12) United States Patent
Hsu et al.

(10) Patent No.: US 7,370,130 B2
(45) Date of Patent: May 6, 2008

(54) CORE LOGIC DEVICE OF COMPUTER SYSTEM

(75) Inventors: Ming-Wei Hsu, Taipei (TW); Wayne Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 85 days.

(21) Appl. No.: 11/408,149

(22) Filed: Apr. 20, 2006

(65) Prior Publication Data

US 2006/0242343 A1    Oct. 26, 2006

(30) Foreign Application Priority Data

Apr. 22, 2005  (TW) ............................... 94113002 A

(51) Int. Cl.
*G06F 12/00* (2006.01)
*H04L 29/06* (2006.01)
*G06Q 30/00* (2006.01)

(52) U.S. Cl. ...................... 710/269; 710/260

(58) Field of Classification Search .............. 710/2, 710/5, 48, 260–269; 709/217, 219; 712/208, 712/244; 713/1, 2
See application file for complete search history.

(56) References Cited

U.S. PATENT DOCUMENTS

| | | | |
|---|---|---|---|
| 6,021,458 A * | 2/2000 | Jayakumar et al. | 710/266 |
| 6,170,025 B1 * | 1/2001 | Drottar et al. | 710/48 |
| 6,192,442 B1 * | 2/2001 | Haren et al. | 710/269 |
| 6,766,398 B2 * | 7/2004 | Holm et al. | 710/260 |
| 6,820,164 B2 * | 11/2004 | Holm et al. | 710/312 |
| 2002/0152334 A1 * | 10/2002 | Holm et al. | 710/2 |
| 2002/0152344 A1 * | 10/2002 | Holm et al. | 710/260 |
| 2003/0221091 A1 * | 11/2003 | Henry et al. | 712/244 |
| 2004/0123090 A1 * | 6/2004 | Zimmer et al. | 713/1 |
| 2005/0125582 A1 * | 6/2005 | Tu et al. | 710/260 |
| 2006/0242343 A1 * | 10/2006 | Hsu et al. | 710/266 |
| 2007/0186023 A1 * | 8/2007 | Ho | 710/266 |

OTHER PUBLICATIONS

"Techniques to enable FPGA based configurable fault tolerant space computing" by Smith et al. (abstract only) Publicatio Date: Mar. 4-11, 2006.*

* cited by examiner

*Primary Examiner*—Gopal C. Ray
(74) *Attorney, Agent, or Firm*—Kirton & McConkie; Evan R. Witt

(57) ABSTRACT

A core logic device of a computer system includes a programmable interrupt controller (PIC), an input/output advanced programmable interrupt controller (I/O APIC) and a virtual wire unit. The PIC outputs a control signal to the virtual wire unit via an interrupt pin in response to an external interrupt signal asserted by a peripheral device before an operating system is loaded in the computer system. The virtual wire unit outputs an interrupt control packet to the CPU in response to the control signal wherein the interrupt vector contents carried by the interrupt control packet are ignored by the CPU. After the operating system is loaded in the computer system, the I/O APIC outputs another interrupt control packet to the CPU in response to the external interrupt signal.

19 Claims, 5 Drawing Sheets

CORE LOGIC DEVICE OF COMPUTER SYSTEM

FIELD OF THE INVENTION

The present invention relates to a core logic device, and more particularly to a core logic device used in a computer system and operable for interrupt control.

BACKGROUND OF THE INVENTION

More and more peripheral devices are developed to operate in coordination with computer systems. Usually, the peripheral device asserts an interrupt signal to request the central processing unit (CPU) of the computer system to perform an interrupt service. Please refer to FIG. 1, which is a functional block diagram illustrating conventional interrupt control means of a computer system. In response to an external interrupt signal asserted by a peripheral device 11 to a programmable interrupt controller (PIC) 121 in the south bridge chip 12, the PIC 121 informs the CPU 13 of the assertion of the external interrupt signal via an interrupt pin (INTR pin). When realizing the interrupt signal assertion, the CPU 13 reads an interrupt vector associated with the external interrupt signal from the PIC 121. According to the interrupt vector, the CPU 13 accesses a service routine from the system memory 10 via the north bridge chip 14 so as to execute the interrupt service. Different interrupt vectors relate to different service routines stored at different addresses in the system memory 10. In the aforementioned prior art, which is so-called as a "PIC mode", the PIC 121 informs the CPU 13 of the interrupt signal assertion via the INTR pin, and then the CPU 13 has to activate an additional reading procedure to obtain the interrupt vector from the PIC 121, which makes the interrupt control complicated.

SUMMARY OF THE INVENTION

The present invention provides a core logic device used in a computer system for controlling the interrupt signal and interrupt service routine.

A core logic device is used in a computer system with a CPU and a peripheral device. The core logic device comprises a PIC and an I/O APIC, both electrically connected to the peripheral device, and a virtual wire unit electrically connected to an interrupt pin of the PIC. Before the operating system is loaded in the computer system, the PIC outputs a control signal to the virtual wire unit via the interrupt pin in response to an external interrupt signal asserted by the peripheral device. Accordingly, the virtual wire unit outputs an interrupt control packet to the CPU. The interrupt control packet contains an interrupt vector that will then be ignored by the CPU. On the other hand, after the operating system is completely loaded in the computer system, the I/O APIC outputs another interrupt control packet to the CPU in response to the optional external interrupt signal.

In an embodiment, the PIC, the I/O APIC and the virtual wire unit are integrated into a south bridge chip as a part of the core logic device. A north bridge chip is also included in the core logic device and is electrically connected to the CPU, the south bridge chip and a system memory storing a plurality of service routines. The CPU is interrupted to read one of the service routines via the north bridge chip.

In an embodiment, the I/O APIC comprises a redirection table built by the operating system. The redirection table contains a plurality of interrupt control packets for providing different interrupt vector contents for the CPU.

In an embodiment, the PIC is disabled and the control signal is suspended after the operating system is completely loaded in the computer.

The virtual wire unit outputs an interrupt control packet including a code enabling the CPU to ignore the interrupt vector carried thereby. The interrupt control packet usually consists of 64 bits, in which the code is "111" bit numbers 8~10. The code is stored in the virtual wire unit so that the code will not be cleared when the I/O APIC is initialized by the operating system.

In an embodiment, the interrupt pin is coupled to both the virtual wire unit and the I/O APIC. The core logic device further comprises a multiplexer electrically connected to the virtual wire unit, the I/O APIC and the CPU. The multiplexer can selectively transmit one of the outputs of the virtual wire unit and the I/O APIC to the CPU before the operating system is loaded in the computer system, while the output of the I/O APIC is always selected after the operating system is loaded in the computer system.

In another aspect, the core logic device comprises a PIC, an I/O APIC, a virtual wire unit, and a multiplexer. The virtual wire unit and the I/O APIC are electrically connected to an interrupt pin of the PIC. Before the operating system is completely loaded, the multiplexer will selectively transmitting one of interrupt control packets outputted by the virtual wire unit and the I/O APIC to the CPU.

DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
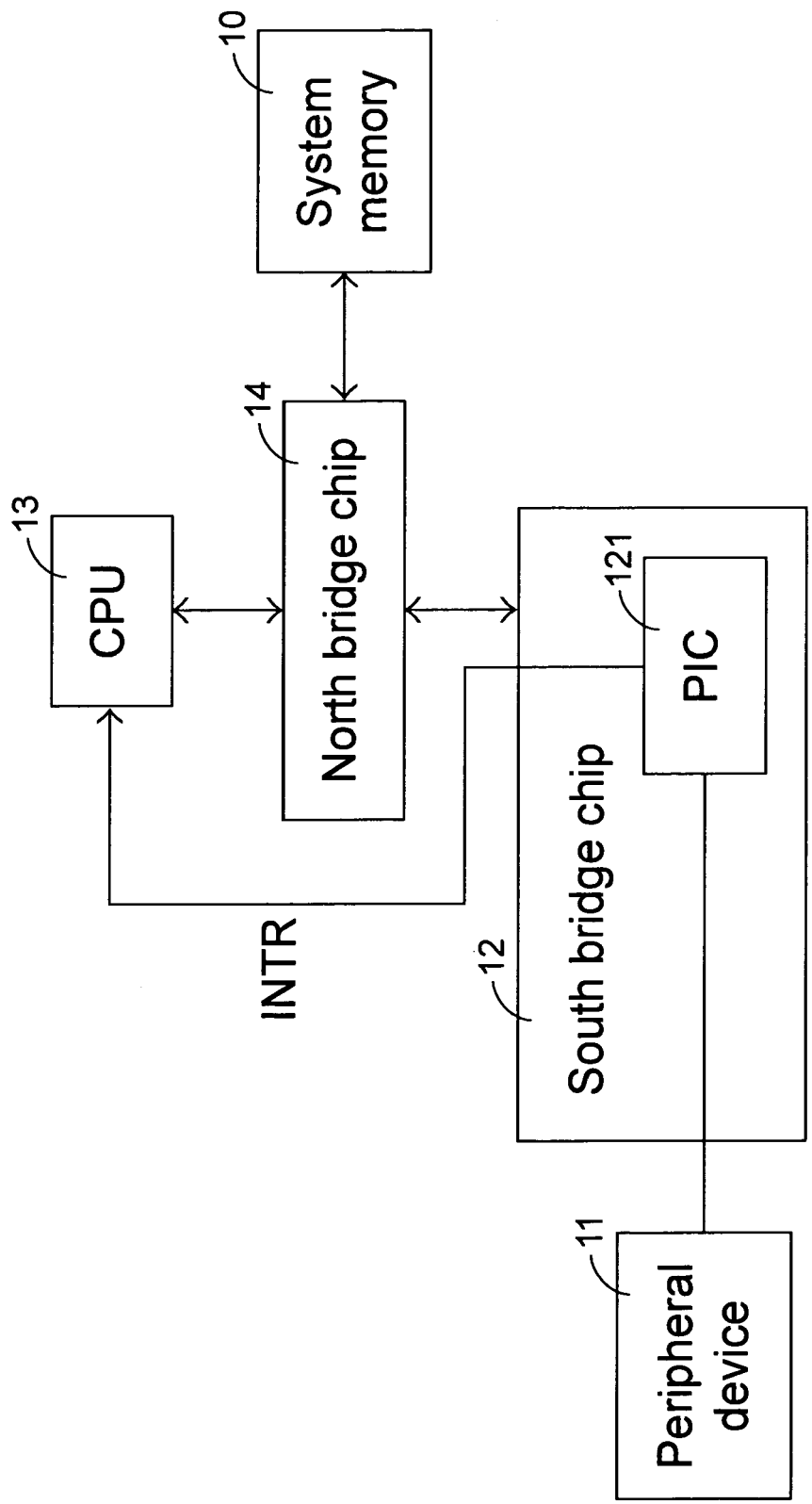
FIG. 1 is a functional block diagram illustrating conventional interrupt control means of a computer system in a PIC mode.
Figure 2:
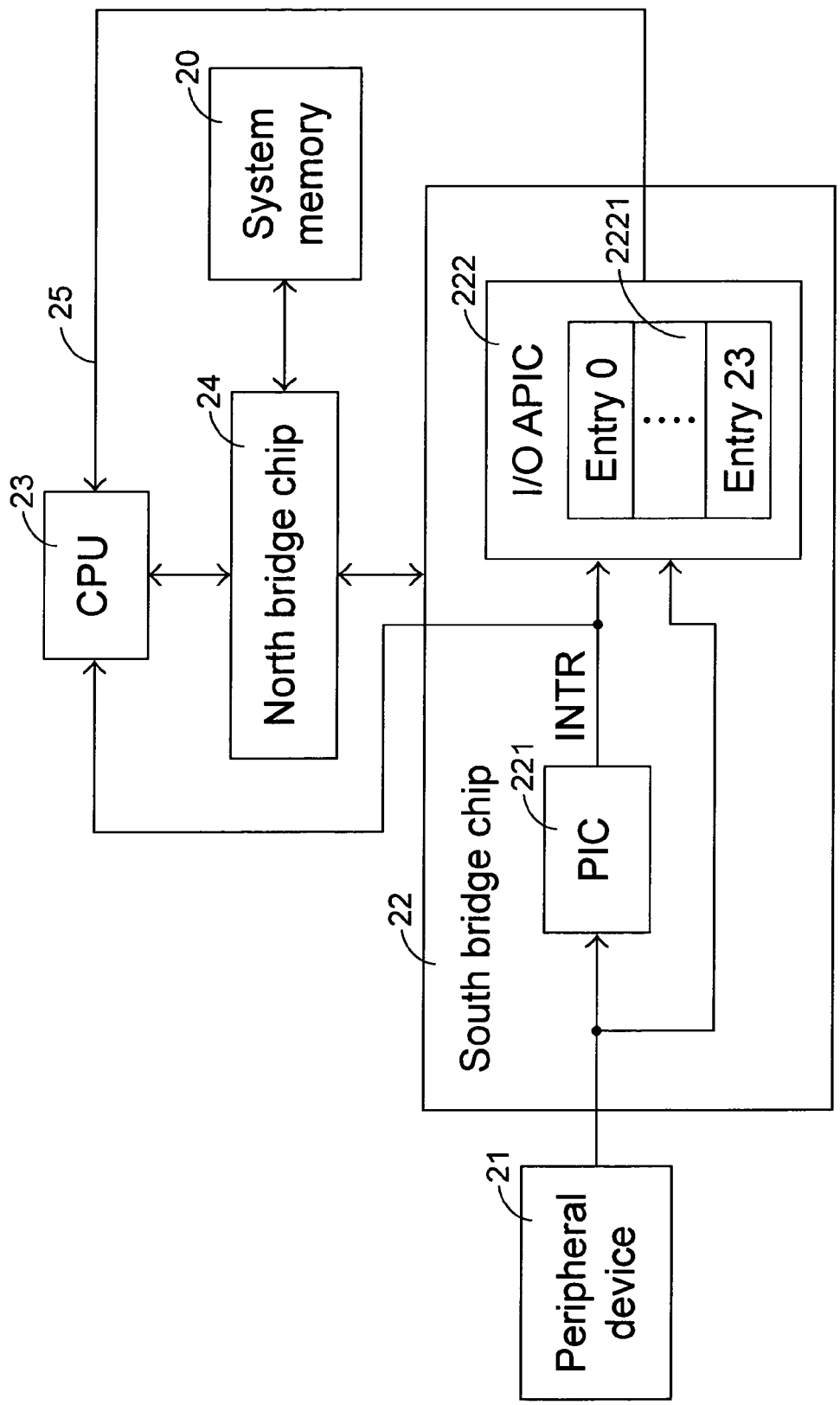
FIG. 2 is a functional block diagram illustrating interrupt control means of a computer system in an APIC mode.

An input/output advanced programmable interrupt controller (I/O APIC) is developed for performing advanced interrupt control, which is schematically shown in FIG. 2. During the booting period of the computer system before entering the operating system, the PIC mode is adopted. That is, once receiving an external interrupt signal asserted by a peripheral device 21, the PIC 221 disposed in the south bridge chip 22 will inform the CPU 23 of the interrupt signal assertion via the INTR pin, and then the CPU 23 will read an interrupt vector from the PIC 221 and load a service routine from the system memory 20 to perform the interrupt service. After the operating system is completely loaded, the PIC 221 will be disabled and the PIC mode is substituted by a so-called "APIC mode" for the interrupt control. In the APIC mode, the I/O APIC 222 performs similar function to the PIC 221. A redirection table 2221 is built in the I/O APIC 222, which contains a plurality of entries, for example, 24 entries of 64-bit from entry 0 to entry 23. When the peripheral device 21 asserts the interrupt signal, the operating system which controls the computer system has the I/O APIC 222 output a specific entry of the redirection table 2221 to the CPU 23 via a bus 25 in response to the external interrupt signal. The outputted entry has included the interrupt vector already, in bit numbers 0~7 in usual. Hence, the CPU 23 may directly load the service routine from the system memory 20 via the north bridge chip 24. Compared with the PIC mode, the time required and flows of data transmitted between the CPU 23 and the I/O APIC 222 are reduced in the APIC mode so as to speed up the computer system.

Figure 3:
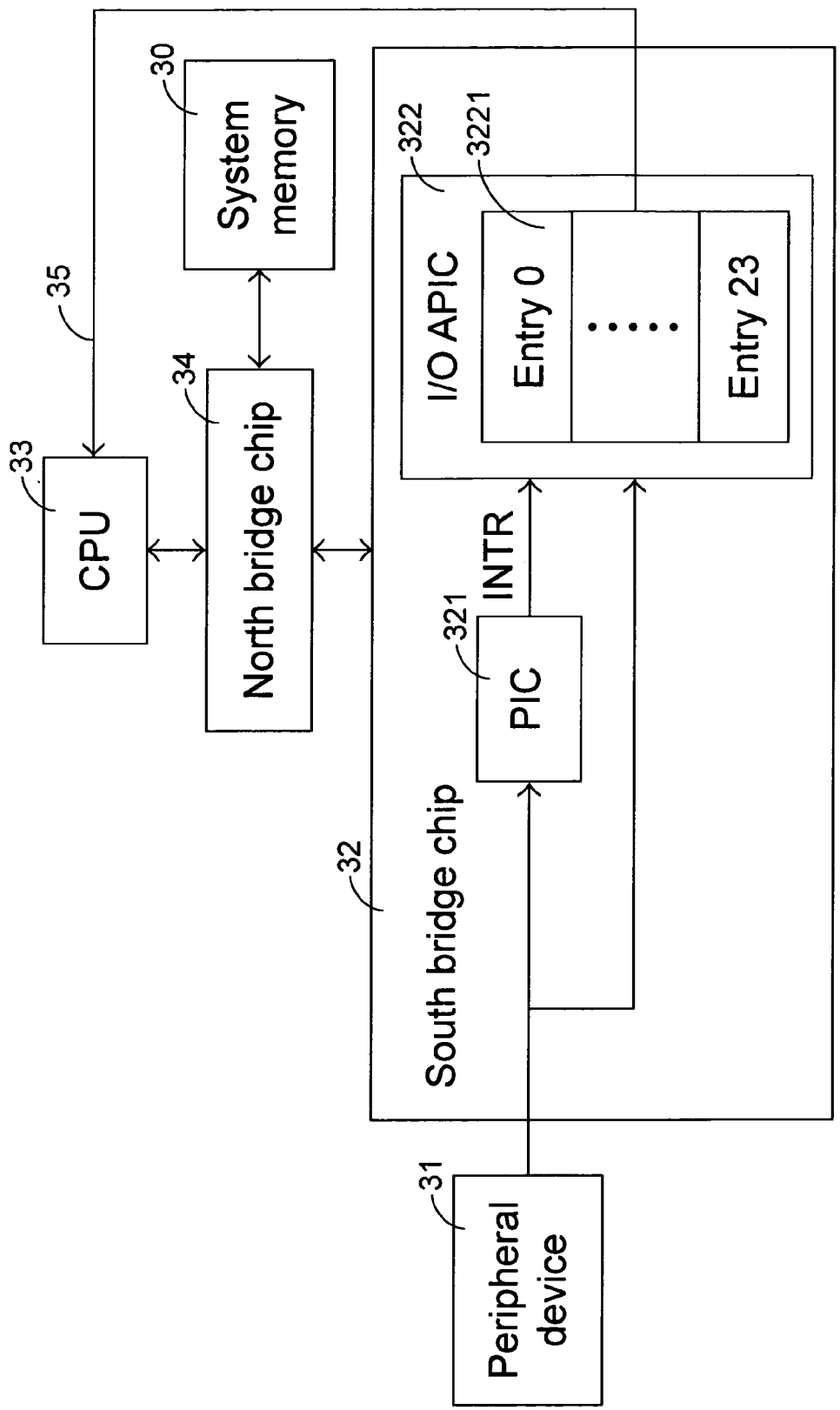
FIG. 3 is a functional block diagram illustrating interrupt control means of a computer system in a virtual wire mode.

However, some modern computer systems have removed the INTR pin from the CPU connection so the PIC mode cannot be applied anymore. Therefore, a so-called "virtual wire mode" is introduced in the multiprocessor specification V1.4 to substitute for the PIC mode when the operating system is not yet loaded. The virtual wire mode can be enabled in the basic input/output system (BIOS) of the computer system. The interrupt control means is illustrated in FIG. 3. Bit numbers 8~10 of entry 0 of the redirection table 3221 are set as "111" in advance. When the PIC 321 of the south bridge chip 32 receives an external interrupt signal asserted by the peripheral device 31, the PIC 321 informs the I/O APIC 322 of the interrupt signal assertion via the INTR pin connected to the I/O APIC 322. The I/O APIC 322 thus outputs entry 0 to the CPU 33 via a bus 35. When realizing that bit numbers 8~10 of entry 0 are "111", the CPU 33 will disregard bit numbers 0~7 of entry 0 outputted from the I/O APIC 322, but reads the interrupt vector directly from the PIC 321. Then, according to the interrupt vector read from the PIC 321, the CPU 33 loads the service routine from the system memory 30 via the north bridge chip 34 for the interrupt service. In other words, the interrupt control can be performed even though the INTR pin directing to the CPU 33 is removed. Without the INTR pin, the CPU 33 reads the interrupt vector from the PIC 321 in response to the entry 0 containing "111" in bit numbers 8~10 outputted from the I/O APIC 322.

After the operating system is completely loaded, the APIC mode dominates the interrupt control, and the PIC 321 is disabled. The I/O APIC 322 outputs a specific entry in the redirection table 3221 to the CPU 33 via the bus 35 in response to the external interrupt signal asserted by the peripheral device 31. The outputted entry has included the interrupt vector already, in bit numbers 0~7 in usual. Hence, the CPU 33 may access the service routine from the system memory 30 via the north bridge chip 34 so as to perform the interrupt service. In this condition, as bit numbers 8~10 of entry 0 have to be kept as "111", only entries 1~23 are available for use in the subsequent APIC mode. Compared with the previous case, in which the computer system is still booting, the entry 0 of the I/O APIC 322 functions as the INTR pin in this case, informing the CPU 33 to read the interrupt vector from the PIC 321. Therefore, only bit numbers 8~10 of the entry 0 are valid for the CPU 33. On the other hand, when the computer system is running with the operating system, the I/O APIC 322 functions as both the PIC 321 and the INTR pin. As a result, the entry 0 must contain information of the external interrupt signal assertion and the interrupt vector of the service routine.

Despite the virtual wire mode may solve the problem of performing the interrupt service before entering an operating system as the INTR pin disconnected to the CPU, other problems may still occur when executing some operating systems, for example, Netware V5.1 & V6.0 produced by Novell Inc. With such an operating system, the I/O APIC 322 will be automatically initialized to clear all the contents in the redirection table 3221, including the preset bit numbers 8~10 "111" of entry 0. Therefore, there would be no way to inform the CPU 33 of the assertion of the external interrupt signal, leading the crash of the computer system. To overcome the disadvantage, it is necessary to modify the interrupt mechanism to prevent the associated settings from undesirable clearing when the connection of the INTR pin to the CPU is removed.

Figure 4:
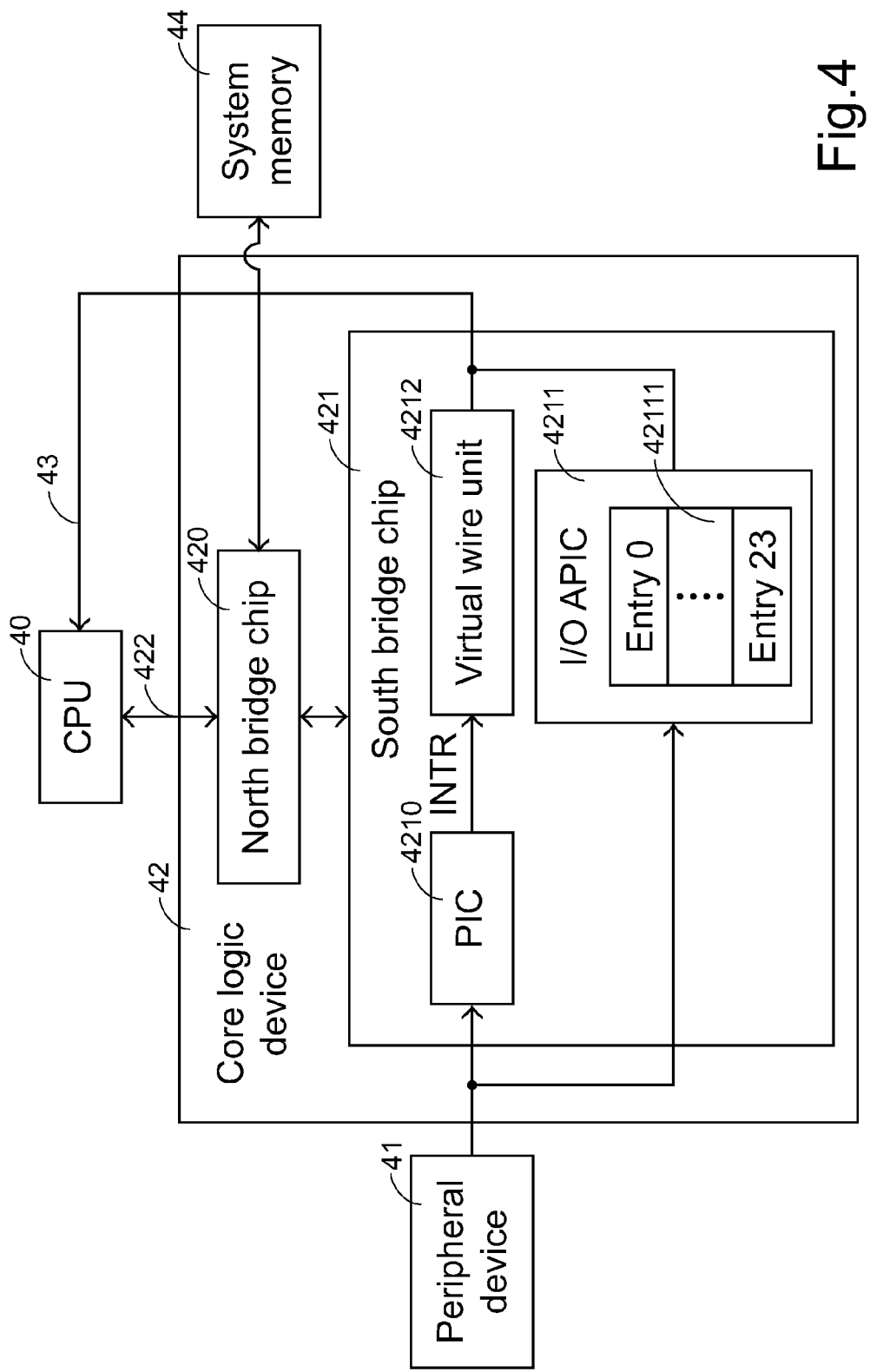
FIG. 4 is a functional block diagram illustrating a preferred embodiment of interrupt control means of a computer system according to the present invention.

Please refer to FIG. 4, which schematically shows a core logic device 42 used in a computer system with a CPU 40 and a peripheral device 41. The core logic device 42 comprises a north bridge chip 420 and a south bridge chip 421 in communication with each other. The north bridge chip 420 is in communication with the CPU 40 via a front-end bus 422, and the south bridge chip 421 comprises a PIC 4210, an I/O APIC 4211 and a virtual wire unit 4212 coupled to an interrupt pin (INTR pin) of the PIC 4210.

Before an operating system is completely loaded in the computer system, a PIC mode is adopted for processing an interrupt signal asserted by the peripheral device 41. The PIC 4210 is electrically connected to the peripheral device 41, and outputs a control signal to the virtual wire unit 4212 via the INTR pin in response to the external interrupt signal asserted by the peripheral device 41. The virtual wire unit 4212 contains virtual wire interrupt control packets. For example, a virtual wire interrupt control packet of 64-bit whose bit numbers 8~10 are filled with a code "111" is provided. Triggered by the control signal from the PIC 4210, the virtual wire unit 4212 will output a virtual wire interrupt control packet to the CPU 40. The virtual wire interrupt control packet outputted by the virtual wire unit 4212 will be transmitted to the CPU 40 via a bus 43, e.g. an interrupt controller communication bus (ICC-Bus). In some circumstances, the connection of the ICC-bus to the CPU 40 is removed. As to those cases, the virtual wire interrupt control packet will be transmitted to the CPU 40 via the front-end bus 422. Since the virtual wire unit 4212 is independent of from the I/O APIC 4211, the code "111" stored in the virtual wire unit 4212 will not be cleared when the operating system or other firmware tries to initialize the I/O APIC 4211. Upon receiving the virtual wire interrupt control packet including the code "111" in bit numbers 8~10, the CPU ignores the interrupt vector contents or other improper information carried by the virtual wire interrupt control packet, and directly reads interrupt vector information associated with the interrupt signal from the PIC 4210. Then, the CPU 40 accesses a service routine from the system memory 44 via the north bridge chip 420 according to the interrupt vector information read from the PIC 4210 for the proper interrupt service, even though the INTR pin of the PIC 4210 connected to the CPU 40 is removed. As mentioned in the prior art, different interrupt vectors relate to different service routines stored at different addresses in the system memory 44. The INTR pin connected to the CPU 40 in the prior art can be replaced by sending a control signal to the virtual wire unit 4212 and an interrupt vector from the I/O APIC 4211 to the CPU 40.

After the operating system is loaded in the computer system, an APIC mode is adopted as described in the aforementioned prior art. The PIC 4210 is disabled and the control signal is suspended as well. In the APIC mode, a redirection table 42111 built in the I/O APIC 4211 containing a plurality of entries is used, for example, 24 entries of 64-bit from entry 0 to entry 23. In response to the external interrupt signal asserted by the peripheral device 41, the I/O APIC 4211 outputs an interrupt control packet, i.e. a specific entry of the redirection table 42111, to the CPU 40 via the bus 43. The outputted entry has already included the interrupt vector, in bit numbers 0~7 in usual. Hence, the CPU 40 can directly load a service routine according to the entry from the system memory 44 via the north bridge chip 420 to accomplish the interrupt service.

Figure 5:
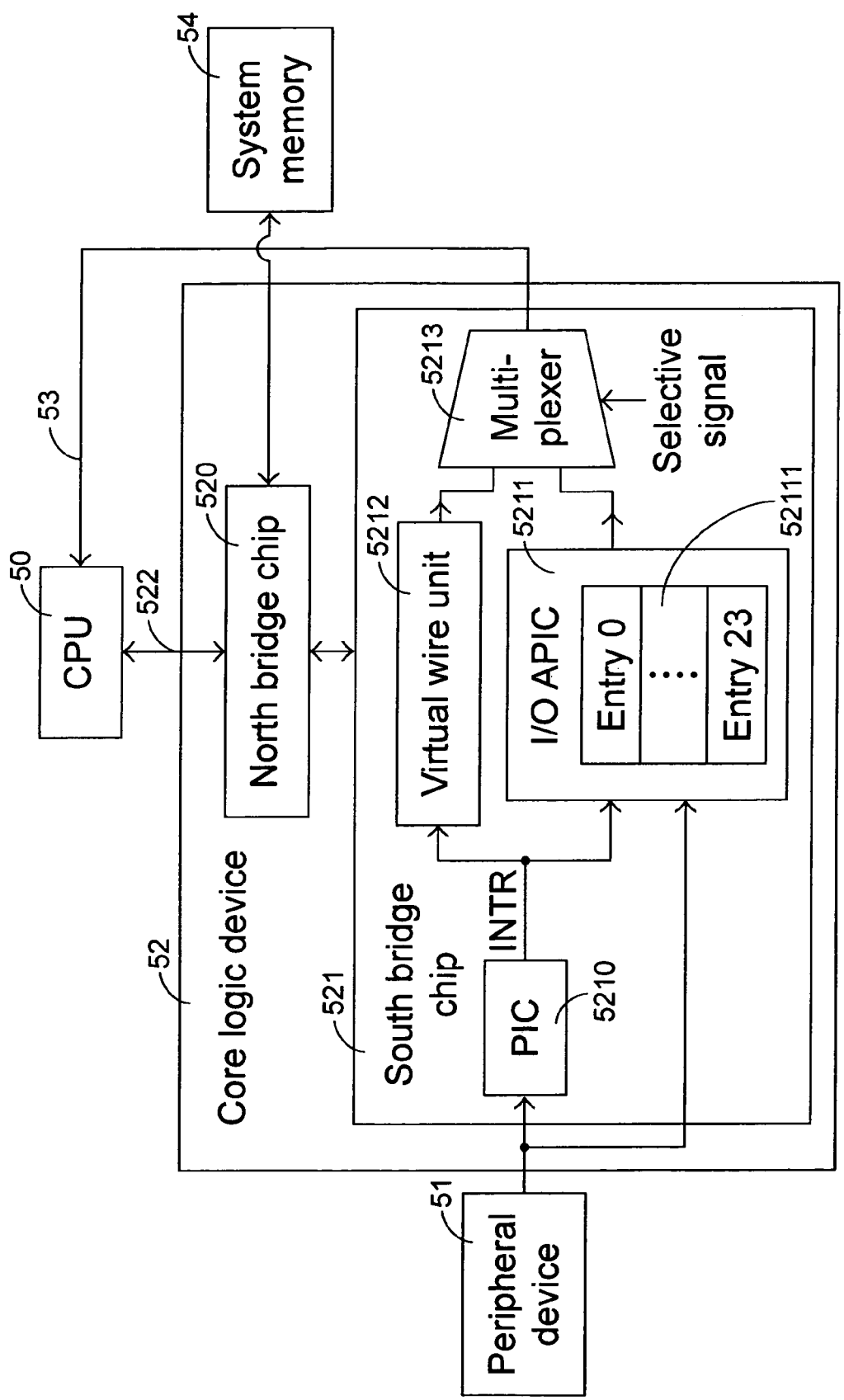
FIG. 5 is a functional block diagram illustrating another preferred embodiment of interrupt control means of a computer system according to the present invention.

Another interrupt control means is schematically shown in FIG. 5. The core logic device 52 is used in cooperation with a CPU 50 and a peripheral device 51 and comprises a north bridge chip 520 and a south bridge chip 521. In addition to the PIC 5210, the virtual wire unit 5212 and the I/O APIC 5211, the south bridge chip 521 further includes a multiplexer 5213. The virtual wire unit 5212 and the I/O APIC 5211 are both coupled to the INTR pin of the PIC 5210, providing more flexibility to the interrupt control. The output ends of the virtual wire unit 5212 and the I/O APIC 5211 are both coupled to the multiplexer 5213, which selects one of the outputs from the virtual wire unit 5212 and the I/O APIC 5211 to be an output to the CPU 50 before the operating system is loaded into the computer system. The multiplexer 5213 selects the outputs from the virtual wire unit 5212 and the I/O APIC 5211 based on a selective signal whose voltage level is preset in the BIOS. In more detail, if the operating system in the computer system does not initialize the redirection table in the I/O APIC 5211, the multiplexer 5213 selects the interrupt control packet from the I/O APIC 5211 to be outputted to the CPU 50. On the contrary, if the operating system in the computer system is likely to improperly initialize the redirection table in the I/O APIC 5211, the multiplexer 5213 selects the interrupt control packet from the virtual wire unit 5212 as described with reference to FIG. 4. After the operating system is loaded in the computer system, the multiplexer 5213 always transmits the interrupt control packet from the I/O APIC 5211 to the CPU 50. According to the interrupt control packet, the CPU 50 accesses a corresponding service routine stored in the system memory 54 through the north bridge chip 520 in response to the interrupt request of the peripheral device 51. In previous embodiments, the interrupt control packet contains the interrupt vector that directs to corresponding interrupt service routine or bits representing the interrupt signal assertion. Hence, the control means is flexible for computer systems operating with various operating systems.

In conclusion, the core logic device according to the present invention prevents failures of the computer system due to improper initialization upon detection of the I/O APIC on the condition that the connection of the INTR pin of the PIC to the CPU is removed, which is a current trend. Certainly, the interrupt control packet outputted by the virtual wire unit is not limited to the one that have the code "111" at bit numbers 8~10. Any interrupt control packet having interrupt contents rendering the CPU to read the interrupt vector information from the PIC is suitable.

while the invention has been described in terms of what is presently considered the most practical and preferred embodiments, it is to be understood that the invention needs not be limited to the ddisclosed embodiment. On the contrary, it is intended ti cover various modifications and similar arrangements included within the spirit and scope of the asppended claims which are to be accorded with the broadest interpretation so as to encompass all such modifications and similar structures.

What is claimed is:

1. A core logic device of a computer system having a central processing unit (CPU) and a peripheral device, comprising:
   a programmable interrupt controller (PIC), electrically connected to the peripheral device for outputting a control signal via an interrupt pin in response to an external interrupt signal asserted by the peripheral device before an operating system is loaded in the computer system;
   an input/output advanced programmable interrupt controller (I/O APIC), electrically connected to the peripheral device for outputting a first interrupt control packet to the CPU in response to said external interrupt signal after the operating system is loaded in the computer system; and
   a virtual wire unit, electrically connected to said interrupt pin of said PIC for outputting a second interrupt control packet to the CPU in response to said control signal, wherein a plurality of interrupt vector contents carried by said second interrupt control packet are ignored by the CPU.

2. The core logic device according to claim 1, comprising a south bridge chip, wherein said PIC, said I/O APIC and said virtual wire unit are integrated into said south bridge chip.

3. The core logic device according to claim 2, further comprising a north bridge chip electrically connected to the CPU, said south bridge chip and a system memory storing a plurality of service routines, wherein the CPU is interrupted to read one of said service routines via said north bridge chip.

4. The core logic device according to claim 1, wherein said I/O APIC comprises a redirection table built by the operating system, and said redirection table contains a plurality of interrupt control packets with different interrupt vector contents, wherein one of said interrupt control packets is outputted as said first interrupt control packet to the CPU after the operating system is loaded in the computer system.

5. The core logic device according to claim 1, wherein said PIC is disabled and said control signal is suspended after the operating system is loaded in the computer system.

6. The core logic device according to claim 1, wherein said second interrupt control packet comprises a code enabling the CPU to ignore said interrupt vector contents carried by said second interrupt control packet.

7. The core logic device according to claim 6, wherein said second interrupt control packet consists of 64 bits, and said code is "111" at bit numbers 8~10.

8. The core logic device according to claim 6, wherein said code is stored in said virtual wire unit, and said virtual wire unit is independent from said I/O APIC and will not be cleared by the operating system.

9. The core logic device according to claim 1, wherein said interrupt pin is coupled to both said virtual wire unit and said I/O APIC, and said core logic device further comprises a multiplexer electrically connected to said virtual wire unit, said I/O APIC and the CPU for selectively transmitting an output from one of said virtual wire unit and said I/O APIC to the CPU before the operating system is loaded in the computer system.

10. The core logic device according to claim 9, wherein the output of said I/O APIC is always selected after said operating system is completely loaded in the computer system.

11. A core logic device of a computer system having a CPU and a peripheral device, comprising:
- a PIC, electrically connected to the peripheral device for outputting a control signal via an interrupt pin in response to an external interrupt signal asserted by the peripheral device before an operating system is loaded in the computer system;
- an I/O APIC, electrically connected to the peripheral device and said interrupt pin of said PIC for outputting a first interrupt control packet in response to said external interrupt signal or said control signal;
- a virtual wire unit, electrically connected to said interrupt pin of said PIC for outputting a second interrupt control packet in response to said control signal before said operating system is loaded in the computer system; and
- a multiplexer, electrically connected to said I/O APIC, said virtual wire unit and the CPU for selectively transmitting an output from one of said virtual wire unit and said I/O APIC to the CPU.

12. The core logic device according to claim 11, wherein said output of said I/O APIC is always selected after said operating system is loaded in the computer system.

13. The core logic device according to claim 11, comprising a south bridge chip, wherein said PIC, said I/O APIC, said virtual wire unit and said multiplexer are integrated into said south bridge chip.

14. The core logic device according to claim 11, further comprising a north bridge chip electrically connected to the CPU, said south bridge chip and a system memory storing a plurality of service routines, wherein the CPU is interrupted to read one of said service routines via said north bridge chip.

15. The core logic device according to claim 11, wherein said I/O APIC comprises a redirection table built by the operating system, and said redirection table contains a plurality of interrupt control packets with different interrupt vector contents, wherein one of said interrupt control packets is outputted as said first interrupt control packet to the CPU after the operating system is loaded in the computer system.

16. The core logic device according to claim 11, wherein said PIC is disabled and said control signal is suspended after said operating system is loaded in the computer system.

17. The core logic device according to claim 11, wherein said second interrupt control packet comprises a code enabling the CPU to ignore said interrupt vector contents carried by said second interrupt control packet.

18. The core logic device according to claim 17, wherein said second interrupt control packet comprises of 64 bits, and said code is "111" at bit numbers 8~10.

19. The core logic device according to claim 17, wherein said code is stored in said virtual wire unit, and said virtual wire unit is independent from said I/O APIC and will not be cleared by the operating system.

* * * * *

UNITED STATES PATENT AND TRADEMARK OFFICE
CERTIFICATE OF CORRECTION

| | | |
|---|---|---|
| PATENT NO. | : 7,370,130 B2 | |
| APPLICATION NO. | : 11/408149 | |
| DATED | : May 6, 2008 | |
| INVENTOR(S) | : Ming-Wei Hsu et al. | |

It is certified that error appears in the above-identified patent and that said Letters Patent is hereby corrected as shown below:

Col. 3, Line 16-42 should read as follows:
 --However, some ~~modem~~ modern computer systems have removed the INTR pin from the CPU connection so the PIC mode cannot be applied anymore. Therefore, a so-called "virtual wire mode" is introduced in the multiprocessor specification V1.4 to substitute for the PIC mode when the operating system is not yet loaded. The virtual wire mode can be enabled in the basic input/output system (BIOS) of the computer system. The interrupt control means is illustrated in FIG. 3. Bit numbers 8.about.10 of entry 0 of the redirection table 3221 are set as "111" in advance. When the PIC 321 of the south bridge chip 32 receives an external interrupt signal asserted by the peripheral device 31, the PIC 321 informs the I/O APIC 322 of the interrupt signal assertion via the INTR pin connected to the I/O APIC 322. The I/O APIC 322 thus outputs entry 0 to the CPU 33 via a bus 35. When realizing that bit numbers 8.about.10 of entry 0 are "111", the CPU 33 will disregard bit numbers 0.about.7 of entry 0 outputted from the I/O APIC 322, but reads the interrupt vector directly from the PIC 321. Then, according to the interrupt vector read from the PIC 321, the CPU 33 loads the service routine from the system memory 30 via the north bridge chip 34 for the interrupt service. In other words, the interrupt control can be performed even though the INTR pin directing to the CPU 33 is removed. Without the INTR pin, the CPU 33 reads the interrupt vector from the PIC 321 in response to the entry 0 containing "111" in bit numbers 8.about.10 outputted from the I/O APIC 322.--

UNITED STATES PATENT AND TRADEMARK OFFICE
CERTIFICATE OF CORRECTION

PATENT NO. : 7,370,130 B2
APPLICATION NO. : 11/408149
DATED : May 6, 2008
INVENTOR(S) : Ming-Wei Hsu et al.

It is certified that error appears in the above-identified patent and that said Letters Patent is hereby corrected as shown below:

Col. 5, Line 59 should read as follows:
--~~while~~ While the invention has been described in terms of what is presently considered the most practical and preferred embodiments, it is to be understood that the invention needs not be limited to the ~~ddisclosed~~ disclosed embodiment. On the contrary, it is intended ~~ti~~ to cover various modifications and similar arrangements included within the spirit and scope of the ~~asppended~~ appended claims which are to be accorded with the broadest interpretation so as to encompass all such modifications and similar structures.--

Signed and Sealed this

Second Day of December, 2008

JON W. DUDAS
*Director of the United States Patent and Trademark Office*